US006319577B1

(12) United States Patent
Guest et al.

(10) Patent No.: US 6,319,577 B1
(45) Date of Patent: Nov. 20, 2001

(54) SHEETS, FILMS, FIBERS FOAMS OR LATICES PREPARED FROM BLENDS OF SUBSTANTIALLY RANDOM INTERPOLYMERS

(75) Inventors: Martin J. Guest, Lake Jackson; John J. Gathers, Pearland; Yunwa W. Cheung; Pak-Wing S. Chum, both of Lake Jackson, all of TX (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/715,565

(22) Filed: Nov. 17, 2000

Related U.S. Application Data

(60) Division of application No. 09/121,461, filed on Jul. 23, 1998, now Pat. No. 6,166,145, which is a continuation-in-part of application No. 08/707,784, filed on Sep. 4, 1996, now abandoned.

(51) Int. Cl.$^7$ .............. C08L 23/02; C08L 25/02; C08L 25/08; D01F 6/44

(52) U.S. Cl. .............. 428/36.92; 428/364; 521/139; 521/140; 524/518; 524/525; 524/528; 525/211; 525/216; 525/240; 525/241

(58) Field of Search .............. 428/36.92, 364; 525/241, 211, 216, 240; 521/139, 140; 524/518, 525, 528

(56) References Cited

U.S. PATENT DOCUMENTS

| | | | |
|---|---|---|---|
| 4,076,698 | 2/1978 | Anderson et al. | 526/348.6 |
| 4,673,711 | 6/1987 | Sharps, Jr. et al. | 525/240 |
| 5,260,384 | 11/1993 | Morimoto et al. | 525/240 |
| 5,288,762 | 2/1994 | Park et al. | 521/79 |
| 5,340,840 | 8/1994 | Park et al. | 521/60 |
| 5,346,963 | 9/1994 | Hughes et al. | 525/285 |
| 5,362,824 | 11/1994 | Furtek et al. | 526/114 |
| 5,362,825 | 11/1994 | Hawley et al. | 526/125 |
| 5,369,193 | 11/1994 | Sano et al. | 526/116 |
| 5,369,194 | 11/1994 | Cribbs et al. | 526/116 |
| 5,369,195 | 11/1994 | Kelsey | 526/119 |
| 5,369,196 | 11/1994 | Matsumoto et al. | 526/127 |
| 5,460,818 | 10/1995 | Park et al. | 426/415 |

FOREIGN PATENT DOCUMENTS

| | | | |
|---|---|---|---|
| 0416815(A2) | 3/1991 | (EP) | C08F/10/00 |
| 0572990(A2) | 8/1993 | (EP) | C08F/210/02 |
| 07/278230 | 10/1995 | (JP) | C08F/210/02 |
| 95/32095 | 11/1995 | (WO) | B32B/27/32 |
| 95/27755 | 10/1995 | (WO) | C08L/25/08 |

OTHER PUBLICATIONS

"First Technical Details on Some Next–Generation Polyolefins", *Plastics Technology*, Sep. 1992. p. 25.
Kurt W. Swogger, "Application of Insite* Technology in the Rubber/Elastomer Market", Worldwide Metallocene Conference Metcon '95, May 17–19, 1995, Houston, Texas.
"Dow Pairs Ethylene, Styrene", *Plastics News*, Jun. 26, 1995, p. 15.
"Dow Plots PP Course", *Chemical Week*, Strategies, Dec. 20–27, 1995, p. 8.
"Metallocene Catalysts Initiate New Era in Polymer Synthesis", *Chemical & Engineering News*, Sep. 11, 1995, pp. 15–20.
Gerald Lancaster, et al., "Applications of Insite* Echnology in the Rubber/Elastomer Market", Proceedings of Fifth International Business Forum on Specialty Polyolefins SPO '95, Sep. 20–22, 1995, pp. 109–123.
Y. W. Cheung, et al., "Structure, Thermal Transitions and Mechanical Properties of Ethylene/Styrene Copolymers", Proceedings of the SPE 54$^{th}$ Annual Technical Conference, 1996, pp. 1634–1637.
C. P. Park, et al., "Compatibilization of Polyethylene–Polystyrene Blends with Ethylene–Styrene random Copolymers", Proceedings of the SPE 54$^{th}$ Annual Technical Conference, 1996, pp. 1887–1891.
"Metallocene Technology Drives New Materials", News Update, *Canadian Plastics*, Jan. 1996, vol. 54, No. 1, p. 8.
"Metallocene Yield Ethylene–Styrene Interpolymers", NEWSFOCUS, *Plastics Technology*, Jan. 1996, p. 13.
"Dow's plan for '96: Become force in PP", *Plastics World*, Jan. 1996, pp. 12–13.
"Ethylene/Styrene Plastics from Dow", *European Chemical News*, Sep. 1996, p. 23.
Toru, Arai et al., "Homo–and Copolymerization of Styrene by Bridged Zirconocene Complexes with Benzindenyl Ligands", Polymer Preprints, (Am. Chem. Soc., Div. Polym. Chem.), 1998, 39 (1), 220–221.
Steve Hoeing et al., "Material Properties and Applications of Ethylene–Styrene Interpolymers from Metallocene Catalyst", Proceedings of Sixth International Business Forum on Specialty SPO '96, Sep. 25–27, 1996, pp. 261–268.
Whelan, Polymer Technology Dictionary, Chapman & Hall, London, 1994, p. 476.
Speed et al., "Structure/Property Relationships in EXXPOL (TM) Polymers", Society of Plastics Engineers Polyolefins VII International Conference, Houston, Texas, Feb. 24–27, 1991.
Jim Stevens, The Dow Chemical Company, Metallocene and Other Single Site Catalysts, PTO Presentation, Dec. 8, 1994.
International Search Report dated Dec. 3, 1997 issued by the EPO acting as the International Searching Authority in PCT/US97/15546.

*Primary Examiner*—Donald R. Wilson

(57) ABSTRACT

A sheet, film, fiber, foam or latex prepared from a blend of polymeric materials comprising a plurality of substantially random interpolymers comprising vinyl aromatic and ethylene and/or alpha olefin monomers and wherein:

a) the amount of polymer units derived from said vinyl aromatic monomer in any interpolymer component differs from that amount in another interpolymer component by at least 0.5 mole percent;

b) the amount of polymer units derived from said vinyl aromatic monomer in the blend is greater than about 19 mole percent; and wherein c) the observed stress relaxation of the resulting blend is greater than the additive stress relaxation of the of the individual blend components.

2 Claims, No Drawings

SHEETS, FILMS, FIBERS FOAMS OR LATICES PREPARED FROM BLENDS OF SUBSTANTIALLY RANDOM INTERPOLYMERS

CROSS REFERENCE TO RELATED APPLICATION

This application is a Divisional of prior application Ser. No. 09/121,461 filed Jul. 23, 1998 U.S. Pat. No. 6,166,145 which is a continuation in part of application Ser. No. 08/707,784 filed Sep. 4, 1996, abandoned.

FIELD OF THE INVENTION

The present invention pertains to blends of α-olefin/vinyl aromatic monomer and/or aliphatic or cycloaliphatic vinyl or vinylidene monomer interpolymers having different vinyl aromatic monomer and/or aliphatic or cycloaliphatic vinyl or vinylidene monomer content or both different vinyl aromatic monomer and/or aliphatic or cycloaliphatic vinyl or vinylidene monomer content and different molecular weight. The blend components are selected to provide superior performance or processability in the blends.

BACKGROUND OF THE INVENTION

The generic class of materials covered by α-olefin/vinyl or vinylidene monomer substantially random interpolymers and including materials such as α-olefin/vinyl aromatic monomer interpolymers are known in the art and offer a range of material structures and properties which makes them useful for varied applications, such as compatibilizers for blends of polyethylene and polystyrene as described in U.S. Pat. No. 5,460,818.

One particular aspect described by D'Anniello et al. (Journal of Applied Polymer Science, Volume 58, pages 1701–1706 [1995]) is that such interpolymers can show good elastic properties and energy dissipation characteristics.

Although of utility in their own right, Industry is constantly seeking to improve the applicability of these interpolymers. Such enhancements nay be accomplished via additives or the like, but it is desrable to develop technologies to provide improvements in processability and/or performance without the addition of additives or further improvements than can be achieved with the addition of additives. To date, the possible advantages of blending to provide materials with superior properties have not been identified.

There is a need to provide blends of α-olefin/vinyl aromatic monomer interpolymers wath superior performance characteristics which will expand the utility of this interesting class of materials.

SUMMARY OF THE INVENTION

The present invention pertains to a blend of polymeric materials comprising a plurality of substantially random interpolymers each interpolymer comprising:
(1) from about 1 to about 65 mole percent of polymer units derived from either
   (a) at least one vinyl aromatic monomer or
   (b) at least one aliphatic or cycloaliphatic vinyl or vinylidene monomer, or
   (c) a combination of at least one vinyl aromatic monomer and at least one aliphatic or cycloaliphatic vinyl or vinylidene monomer, and
(2) from about 35 to about 99 mole percent of polymer units derived from ethylene and/or at least one aliphatic alpha olefin having from 3 to 20 carbon atoms; and wherein:

the amount of polymer units derived from vinyl aromatic monomer and/or aliphatic or cycloaliphatic vinyl or vinylidene monomer in any interpolymer component differs from that amount in another interpolymer component by at least 0.5 mole percent.

The blends of the present invention can comprise, consist essentially of or consist of any two or more of such interpolymers enumerated herein. Likewise, the interpolymers can comprise, consist essentially of or consist of any two or more of the enumerated polymerizable monomers.

DETAILED DESCRIPTION OF THE INVENTION

The percent difference in Mn between the interpolymers in the blends of the present invention is determined by subtracting the Mn of the interpolymer with the lowest Mn from the interpolymer with the highest Mn and dividing the difference with the Mn of the interpolymer with the lowest Mn and multiplying by 100. In those instances wnere more than 2 interpolymers are employed in the blend, the percent difference is determined for each combination of two polymers e.g. for a blend of interpolymers A, B and C, the determination is made for the combinations: A & B, A & C and B & C.

The term "hydrocarbyl" means any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

The term "plurality" as used herein means two or more.

The term "substantially random" in the substantially random interpolymer comprising an α-olefin and a vinyl aromatic monomer or aliphatic vinyl or vinylidene monomer as used herein means that the distribution of the monomers of said interpolymer can be described by the Bernoulli statistical model or by a first or second order Markovian statistical model, as described by J. C. Randall in *POLYMER SEQUENCE DETERMINATION, Carbon-13 NMR Method*, Academic Press New York, 1977, pp. 71–78. Preferably, the substantially random Interpolymer comprising an α-olefin and a vinyl aromatic monomer does not contain more than 15 percent of the total amount of vinyl aromatic monomer in blocks of vinyl aromatic monomer of more than 3 units. More preferably, the interpolymer was not characterized by a high degree of either isotacticity or syndiotacticity. This means that in the 13C-NMR spectrum of the substantially random interpolymer the peak areas corresponding to the main chain methylene and methine carbons representing either meso dial secuences or racemic diad sequences should not exceed 75 percent of the total peak area of the main chain methylene and methine carbons.

Any numerical values recited herein include all values on the lower value to the upper value in increments of one unit provided that there is a separation of at least 2 units between any lower value and any higher value. As an example, if it is stated that the amount of a component or a value of a process variable such as, for example, temperature, pressures time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intented and all possible combinations of numerical values between the lowest value and the highest value enumerated are to be considered to be expressly stated in this application in a similar manner.

The interpolymers suitable for blending to make the blends comprising the present invention include substantially random interpolymers prepared by polymerizing one or more α-olefins with one or more vinyl aromatic monomers and/or one or more aliphatic or cycloaliphatic vinyl or vinylidene monomers.

Suitable α-olefins include for example, ethylene and α-olefins containing from 3 to about 20, preferably from 3 to about 12, more preferably from 3 to about 8 carbon atoms. Particularly suitable are ethylene, propylene, butene-1,4-methyl-1-pentene, hexene-1 and octene-1. These α-olefins do not contain an aromatic moiety.

Suitable vinyl aromatic monomers include, for example, those represented by the following formula:

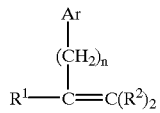

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 6, preferably from zero to about 2, more preferably zero. Exemplary vinyl arcmatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, α-methyl styrene, the lower alkyl- or phenyl-ring substituted derivatives of styrene, such as ortho-, meta-, and para-methylstyrene, the ring halogenated styrenes, para-vinyl toluene or mixtures thereof, and the like. A more preferred vinyl aromatic monomer is styrene.

Suitable aliphatic or cycloaliphatic vinyl or vinylidene monomers which can be employed herein include, for example, the addition polymerizable vinyl or vinylidane monomers corresponding to the formula:

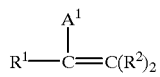

wherein and $A^1$ is a sterically bulky, aliphatic or cycloaliphatic substituent of up to 20 carbons, $R^1$ is selected from the group of radicals consisting of hydrocarbyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, prefer-ably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. Preferred aliphatic or cycloaliphatic vinyl or vinylidene monomers are those in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred aliphatic or cycloaliphatic vinyl or vinylidene monomers are the various isomeric vinyl-ring substituted derivatives of cyclohexene and substituted cyclohexenes, and 5-ethylidene-2-norbornene. Especially suitable are 1-, 3-, and 4-vinylcyclohexane.

The interpolymers of ethylene and/or one or more α-olefins and one or more vinyl aromatic comonomers and/or one or more aliphatic or cycloaliphatic vinyl or vinylidene comonomers employed in the present invention are substantially random polymers. The substantially random interpolymers are homogeneous interpolymers in that the comonomer content of the interpolymer is essentially the same across the interpolymer molecular weight distribution. These interpolymers usually contain from about 1 to about 65, preferably from about 5 to about 60, more preferably from about 10 to about 55 mole percent of at least one vinyl aromatic monomer and/or aliphatic or cycloaliphatic vinyl or vinylidene monomer and from about 35 to about 99, preferably from about 40 to about 95, more preferably from about 45 to about 90 mole percent of ethylene, and/or a least one aliphatic α-olefin having from 3 to about 20 carbon atoms.

The mol % styren content of a blend of two ethylene/styrene interpolymers (ESI 1 and ESI 2) can be expressed as the sum of the weighted averages of the mol % styrene contents of each individual blend components and can be calculated as:

((Wt % ESI 1/100)×ESI 1 Styrene mol %)+((Wt % ESI 2/100)× ESI 2 Styrene mol %)

The number average molecular weight (Mn) of the interpolymer blend components is usually greater than about 1,000, preferably from about 5,000 to about 1,000,000, more preferably from about 10,000 to about 500,000.

The present invention provides blends of interpolymer components of molecular weight and composition distributions selected to obtain an overall molecular weight and composition distribution which gives enhanced properties or processability.

The interpolymer blend components are distinct in that the amount of vinyl aromatic monomer and or aliphatic or cycloaliphatic vinyl or vinylidene monomer in any interpolymer component differs from another by at least 0.5 mole percent, preferably by at least 1 mole percent and most preferably by 2 mole percent.

In one preferred embodiment, there is a difference of at least 20 percent, preferably at least 30 percent and most preferably at least 40 percent between the number average molecular weight(Mn) of interpolymer components.

The blends of the present invention typically have broader molecular weight distributions than those of the individual blend components. If the molecular weights of the individual interpolymer blend components are sufficiently different, the molecular weight distribution profile of the resulting blend (as measured by G.P.C.) can appear bimodal (or even multimodal if more than two interpolymers are blended). Depending on the molecular weights of the individual interpolymer blend components, then the molecular weight distribution profile of the resulting blend may also still appear unimodal but it will be broader than the molecular weight distribution profiles of the individual interpolymer blend components.

Specifically, in one embodiment, the components for the blend are substantially random interpolymers having a relatively narrow molecular weght distribution, with Pw/Mn<3.5, and prepared via constrained geometry catalyst polymerization techniques. Utilzing these interpolymers as components, the invention provides interpolymers having plural modality with respect to comonomer content and a narrow molecular weight distribution, such that Mw/Mn<3.5. In another aspect, the inventon provides interpolymers having plurality with respect both to molecuiar weight distribution, such that Mw/Mn<3.5, and comonomer content.

While preparing the substantially random interpolymer, an amount of atactic vinyl aromatic homopolymer may be formed due to homopolymerization of the vinyl aromatic monomer at elevated temperatures. In general, the higher the polymerization temperature was, the higher is the amount of homopolymer formed. The presence of vinyl aromatic homopolymer is in general not detrimental for the purposes of the present invention and may be tolerated. The vinyl aromatic homopolymer may be separated from the interpolymer, if desired, by extraction techniques such as selective precipitation from solution with a non solvent for either the interpolymer or the vinyl aromatic homopolymer. For the purpose of the present invention it is preferred that no more than 20 weight percent, more preferably less than 15 weight percent, most preferably less than 10 weight percent of the vinyl aromatic homopolymer based on the total weight of the interpolymer plus homopolymer is present in the interpolymer blend component.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers are prepared by polymerizing a mixture of polymerizable monomers in the presence of metallocene or constrained geometry catalysts.

The substantially random interpolymers can be prepared as described in EP-A-0,416,815 by James C. Stevens et al. and U.S. Pat. No. 5,733,187 by Francis J. Timmers, both of which are incorporated herein by reference in their entirety. Such a method of preparation of the substantially random interpolymers includes polymerizing a mixture of polymerizable monomers in the presence of one or more metallocene or constrained geometry catalysts in combination with various cocatalysts. Preferred operating conditions for such polymerization reactions are pressures from atmospheric up to 3000 atmospheres and temperatures from −30° C. to 200° C. Polymerizations and unreacted monomer removal at temperatures above the autopolymerization temperature of the respective monomers may result in formation of some amounts of homopolymer polymerization products resulting from free radical polymerzation.

Examples of suitable catalysts and methods for preparing the substantially random interpolymers are disclosed in U.S. application Ser. No. 702,475, Filed May 20, 1991 (EP-A-514,828); as well as U.S. Pat. Nos. 5,055,438; 5,057,475; 5,096,867; 5,064,802; 5,132,380; 5,189,192; 5,321,106; 5,347,024; 5,350,723; 5,374,696; 5,399,635; 5,470,993; 5,703,187; and 5,721,185 all of which patents and applications are incorporated herein by reference.

The substantially random α-olefin/vinyl aromatic interpolymers can also be prepared by the methods described in JP 07/278230 employing compounds shown by the general formula

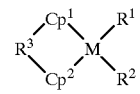

where $Cp^1$ and $Cp^2$ are cyclopentadienyl groups, indenyl groups, fluorenyl groups, or substituents of these, independently of each other; $R^1$ and $R^2$ are hydrogen atoms, halogen atoms, hydrocarbon groups with carbon numbers of 1–12, alkoxyl groups, or aryloxyl groups, independently of each other; M is a group IV metal, preferably Zr or Hf, most preferably Zr; and $R^3$ is an alkylene group or silanediyl group used to cross-link $Cp^1$ and $Cp^2$).

The substantially random α-olefin/vinyl aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in *Plastics Technology*, p. 25 (September 1992), all of which are incorporated herein by reference in their entirety.

Also suitable are the substantially random interpolymers which comprise at least one α-olefin/vinyl aromatic/vinyl aromatic/α-olefin tetrad disclosed in U.S. application Ser. No. 08/708,809 filed Sep. 4, 1996 and WO 98/09999 both by Francis J. Timmers et al. These interpolymers contain additional signals in their carbon-13 NMR spectra with intensities greater than three times the peak to peak noise. These signals apcear in the chemical shift range 43.70–44.25 ppm and 38.0–38.5 ppm. Specifically, major peaks are observed at 44.1, 43.9, and 38.2 ppm. A proton test NMR experiment indicates that the signals in the chemical shift region 43.70–44.25 ppm are methine carbons and the signals in the region 38.0–38.5 ppm are methylene carbons.

It is believed that these new signals are due to sequences involving two head-to-tail vinyl aromatic monomer insertions preceded and followed by at least one αolefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/ vinyl aromatic monomer/ethylene tetrad will give rise to similar corbon-13 NMR peaks but with slightly different chemical shifts.

These interpolymers can be prepared by conducting the polymerization at temperatures of from about −30° C. to about 250° C. in the presence of such catalysts as those represented by the formula

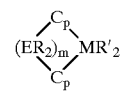

wherein: each Cp is independently, each occurrence, a substituted cyclopentadienyl group π-bound to M; E is C or Si; M is a group IV metal, preferably Zr or Hf, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30 preferably from 1 to about 20 more preferably from 1 to about 10 carbon or silicon atoms or two R' groups together can be a $C_{1-10}$ hydrocarbyl substituted 1,3-butadiene; m is 1 or 2; and optionally, but preferably in the presence of an activating cocatalyst. Particularly, suitable substituted cyclopentadienyl groups include those illustrated by the formula:

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivatvie of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl)-bis-(2-methyl-4-phenylindenyl))zirconium dichloride, racemic-(dimethylsilanediyl)-bis-(2-methyl-4-phenylindenyl)) zirconium 1,4-diphenyl-1,3-butadiene, racemic-(dimetehylsilanediyl)-bis-(2-methyl-4-phenylindenyl)) zirconium di-C1-4 alkyl, racemic-(dimethylsilanediyl)-bis-(2-methyl-4-phenylindenyl))zirconium di-C1-4 alkoxide, or any combination thereof and the like.

It is also possible to use the following titanium-based constrained geometry catalysts, [N-(1,1-dimethylethyl)-1,1-dimethyl-1-[(1,2,3,4,5-η)-1,5,6,7-tetrahydro-s-indacen-1-yl]silanaminato(2-)-N]titanium dimethyl; (1-indenyl)(tert-butylamido) dimethyl-silane titanium dimethyl; ((3-tert-butyl) (1,2,3,4,5-η)-1-indenyl) (tert-butylamido) dimethylsilane titanium dimethyl; and ((3-iso-propyl) (1,2,3,4,5-η)-1-indenyl) (tert-butyl amido)dimethylsilane titanium dimethyl; or any combination thereof and the like.

Further preparative methods for the interpolymers used in the present invention have been described in the literature. Longo and Grassi (*Makromol. Chem.*, Volume 191, pages 2387 to 2396 [1990]) and D'Anniello et al. (Journal of Applied Polymer Science, Volume 58, pages 1701–1706 [1995]) reported the use of a catalytic system based on methylalumoxane (MAO) and cyclopentadienyl titanium trichloride ($CpTiCl_3$) to prepare an ethylene-styrene copolymer. Xu and Lin (*Polymer Preprints, Am. Chem. Soc., Div. Polym. Chem.*) Volume 35, pages 686, 687 [1994]) have reported copolymerization using a $MgCl_2/TiCl_4/NdCl_3/Al$ $(iBu)_3$ catalyst to give random copolymers of styrene and propylene. Lu et al (*Journal of Applied Polymer Science*, Volume 53, pages 1453 to 1460 [1994]) have described the copolymerization of ethylene and styrene using a $TiCl_1/NdCl_3/MgCl_2/Al(Et)_3$ calalyst. Sernetz and Mulhaupt, (*Macromol. Chem. Phys.*, v. 197, pp. 1071–1083, 1997) have described the influence of polymerization conditions on the copolymerization of styrene with ethylene using $Me_2Si$ $(Me_4Cp)$ (N-tert-butyl)$TiCl_2$/methylaluminoxane Ziegler-Natta catalysts. Copolymers of ethylene and styrene produced by bridged metallocene catalysts have been described by Arai, Toshiaki ard Suzuki (*Polymer Preprints, Am. Chem. Soc., Div. Polym. Chem.*) Volume 38, cages 349, 350 [1997]) and in U.S. Pat. No. 5,652,315, issued to Mitsui Toatsu Chemicals, Inc. The manufacture of α-olefin/vinyl aromatic monomer interpolymers such as propylene/styrene and butene/styrene are described in U.S. Pat. No. 5,244,996, issued to Mitsui Petrochemncal Industres Ltd or U.S. Pat. No. 5,652,315 also issued to Mitsui Petrochemical Industries Ltd or as disclosed in DE 197 11 339 A1 to Denki KAGAKU Kogyo KK. All the above methods disclosed for preparing the interpolymer component are incorporated herein by reference.

The blends of the present invention may be prepared by any suitable means known in the art such as, but not limited to, dry blending in a pelletized form in the desired proportions followed by melt blending in a screw extruder, Banbury mixer or the like. The dry blended pellets may be directly melt processed into a final solid state article by for example injection molding. Alternatively, the blends may be made by direct polymerization, without isolation of the blend components, using for example two or more catalysts in one reactor, or by using a single catalyst and two or more reactors in series or parallel.

Expressly excluded from the blend compositions of the present invention are blends comprising fractions of a single substantially random interpolymer of specific comonomer content, separated on the basis of molecular weight, and recombined to make a blend composition.

Additives such as antioxidants (e.g., hindered phenols such as, for example, IRGANOX® 1010), phosphites (e.g., IRGAFOS® 168)), U.V. stabilizers, cling additives (e.g., polyisobutylene), antlblock additives, slip agents, colorants, pigments, fillers, and the like can also be included in the interpolymers employed in the blends of the present invention, to the extent that they do not interfere with the enhanced properties discovered by Applicants.

The additives are employed in functionally equivalent amounts known to those skilled in the art. For example, the amount of antioxidant employed is that amount which prevents the polymer or polymer blend from undergoing oxidation at the temperatures and environment employed during storage and ultimate use of the polymers. Such amounts of antioxidants is usually in the range of from about 0.01 to about 10, preferably from about 0.05 to about 5, more preferably from about 0.1 to about 2 percent by weight based upon the weight of the polymer or polymer blend.

Similarly, the amounts of any of the other enumerated additives are the functionally ecuivalent amounts such as the amount to render the polymer or polymer blend antiblocking, to produce the desired amount of filler loading to produce the desired result, to provide the desired color from colorant or pigment. Such additives can suitably be employed in the range of from about 0.05 to about 50, preferably from about to about 35 more preferab fom about 0.2 to about 20 percent by weight based upon the weight of the polymer or polymer blend. However, in the instance of fillers, they could be employed in amounts up to about 90 percent by weight based on the weight of the polymer or polymer blend.

These blends of the present invention provide an improvement in one or more of the polymer properties such as mechanical performance, melt processability, and/or high temperature performance. Specifically the observed % stress relaxation of the blends of the present invention is greater than what would be expected from the weighted average of the % stress relaxation values of the individual blend components as calculated by the following formula:

(Wt % ESI 1/100)×ESI 1 % Stress Relax)+((Wt % ESI 2/100)× ESI 2 % Stress Relax)

Additionally when at least one of the blend components has a low styrene content the softening temperatures of the blend is higher than what would be expected from the weighted average of the individual blend components.

The blends of the present invention can be utilized to produce, but not limited to, a wide range of fabricated articles such as, for example, calendered sheet, blown films, injection molded, rotomolded or thermoformed parts, and the like. The blends can also be used in the manufacture of fibers, foams and latices. The blends of the present invention can also be utilized in adhesive formulations.

The following examples are illustrative of the invention, but are not to be construed as to limiting the scope thereof in any manner.

temperature and the catalyst components: Titanium: (N-1,1-dimethylethyl)dimethyl(1-(1,2,3,4,5-eta)-2,3,4,5-tetramethyl-2,4-cyclopentadien-1-yl)silanaminato))(2-)N)-dimethyl, CAS# 135072-62-7, Tris(pentafluorophenyl) boron, CAS# 001109-15-5, Modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™ 1010 anti-oxidant is then added to the solution and the polymer is isolated from the solution. Catalyst efficiency is generally greater than 100,000 # polymer per # Ti. The resulting polymers are isolated from solution by either stripping with steam in a vessel or by use of a devolatilizing extruder. In the case of the steam stripped material, additional processing is required in extruder-like equipment to reduce residual moisture and any unreacted styrene.

| Inter-polymer | Solvent loaded | | Styrene loaded | | Pressure | | Temp. °C. | Total H$_2$ Added Grams | Run Time Hours | Polymer in Solution Wt. % |
|---|---|---|---|---|---|---|---|---|---|---|
| | lbs | kg | lbs | kg | g | kpa | | | | |
| (A) | 252 | 114 | 132 | 59 | 42 | 290 | 60 | 0 | 2.8 | 11.5 |
| | | | 0 | 9 | | | | | | |
| (B) | 839 | 381 | 661 | 30 | 105 | 724 | 60 | 53.1 | 4.8 | 11.6 |
| | | | | 0 | | | | | | |
| (C) | 1196 | 542 | 225 | 10 | 70 | 483 | 60 | 7.5 | 6.1 | 7.2 |
| | | | | 2 | | | | | | |
| (E) | 842 | 382 | 662 | 30 | 105 | 724 | 60 | 8.8 | 3.7 | 8.6 |
| | | | | 0 | | | | | | |

| Interpolymer | Melt Index I$_2$ | Total Wt % Styrene in Polymer* | Talc Level Wt % | Isolation Method |
|---|---|---|---|---|
| (A) | 0.18 | 81.7 | <2.5 | Steam Strip |
| (B) | 2.6 | 45.5 | 0 | Extruder |
| (C) | 0.03 | 29.8 | 0 | Extruder |
| (E) | 0.01 | 48.3 | <1.0 | Steam Strip |

*Total wt. % styrene measured via Fourier Transform Infrared (FTIR) technique.

EXAMPLES

Preparation of Interpolymers A, B, C, and E

Polymer is prepared in a 400 gallon agitated semi-continuous batch reactor. The reaction mixture consisted of approximately 250 gallons a solvent comprising a mixture of cyclohexane (85 wt %) & isopentane (15 wt %), and styrene. Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run Preparation of Interpolymer D Interpolymer D is prepared in the following manner.

A 130 mL continuous loop reactor, consisting of two static mixers, a gear pump (1200 mL/min), inlets for liquids and gasses, a viscometer and a pair of thermocouples, is used to prepare the polymer. The reactor temperature is maintained by external heating tapes. Pressure is monitored at the liquid inlet and controlled via a variable valve on the outlet. The reactor is fed with a mixture of 75 weight percent styrene and 25 weight percent toluene at 12.00 mL/min, ethylene at 0.700 g/min, hydrogen at 0.411 mg/min and a catalyst system composed of 0.001 M toluene solutions of tert-butylamidodimethyl(tetramethylcyclopenta-dienyl)silanetitaniumdimethyl and tris-(pentafluoro-phenyl)borane both at 0.25 mL/min. The reactor temperature is held at 100°

C. and the viscosity allowed to stabilize at ~15 cP (0.015 Pa·s). The resulting polymer solution is blended with 0.05 mL/min of a catalyst deactivator/polymer stabilizer solution (1 L of toluene, 20 g of Irganox 1010 and 15 mL of 2-propanol), cooled to ambient temperature and collected for 20 hours and 50 minutes. The solution is dried in a vacuum oven overnight, resulting in 750 g of a 16.6 mole % styrene ethylene/styrene copolymer with 6.5 Wt % ataczic polystyrene having a melt index greater than 200.

The characteristics of each of the interpolymers are given in table 1. The unblended interpolymers provide the comparative examples employed herein.

peratures and heat of transition for the interpolymers. In order to eliminate previous thermal history, samples are first heated to 200° C. Heating and cooling curves are recorded at 10° C./min. Melting (from second heat) and crystallization temperatures are recorded from the peak temperatures of the endotherm and exotherm, respectively.

Melt Shear Rheology: Oscillatory shear rheology measurements are performed with a Rheometrics RMS-800 rheometer. Rheological properties are monitored at an isothermal set temperature of 190° C. in a frequency sweep mode.

Mechanical Testing: Shore A hardness is measured at 23° C. following ASTM-D240. Flexural modulus is evaluated

TABLE 1

| Interpolymer Composition | INTERPOLYMER | | | | |
|---|---|---|---|---|---|
| | (A) | (B) | (C) | (D) | (E) |
| wt % atactic Polystyrene[c] | 8.6 | 10.3 | 1 | 6.5 | 3.7 |
| wt % Styrene[c] | 69.4 | 43.4 | 29.3 | 42.4 | 47.3 |
| wt % Ethylene | 30.6 | 56.6 | 70.7 | 57.6 | 52.7 |
| mol % Styrene | 37.9 | 17.1 | 10 | 16.5 | 19.5 |
| mol % Ethylene | 62.1 | 82.9 | 90 | 83.5 | 80.5 |
| Molecular Weight | | | | | |
| MFR, $I_2$ | 0.18 | 2.62 | 0.03 | >200 | 0.01 |
| $M_n \times 10^3$ | 161.1 | 66.8 | 118.1 | 13.6 | 144.9 |
| $M_w/M_{n(polydispersity)}$ | 2.11 | 1.89 | 2.04 | 13.1 | 2.26 |
| Physical Properties | | | | | |
| Density.g/cc | 1.0352 | 0.9626 | 0.943 | 0.9756 | 0.9604 |
| Tm, ° C. | [a] | 49.6 | 71.3 | 62.1 | 45.7 |
| % Crystallinity | [a] | 4.8 | 14.7 | 4.6 | 4.7 |
| Tc, ° C. | [a] | 22.1 | 58.1 | 46.6 | 17 |
| Tg (DSC) | 24.2 | ~]-12 | −17.2 | [a] | −12.7 |
| Mechanical Properties | | | | | |
| Shore A | 96 | 75 | 88 | 78 | 76 |
| Tensile Modulus, MPa | 594.3 | 6.5 | 20 | 19.3 | 6.8 |
| Flexural Modulus, MPa | 617.1 | 68.8 | 62.1 | 84.8 | 140.7 |
| Yield Stress, MPa | 5.6 | 1.3 | 2.4 | 2.3 | 1.5 |
| % Strain @ Break | 257.8 | 475.3 | 377.5 | 412.8 | 337.8 |
| Stress @ Break, MPa | 21.5 | 22.6 | 34.3 | 2.5 | 17.4 |
| Energy @ Break, N.m | 118.5 | 102.2 | 145.5 | 33.9 | 73.2 |
| % Stress Relaxation | 92.9 | 38 | 30.2 | 43.2 | 26.2 |
| Melt Rheology | | | | | |
| $\eta \times 10^5$ (0.1 rad/sec), Poise | 6.53 | 1.05 | 16.6 | [b] | 31 |
| $\eta$ (100/0.1) | 0.048 | 0.15 | 0.16 | [b] | 0.038 |
| Tan δ (0.1 rad/sec) | 4.42 | 4.2 | 2.37 | [b] | 1.26 |

[a]Could not be measured by DSC.
[b]Could not be measured.
[c]Measured by N.M.R. techniques Test parts and characterization data for the interpolymers and their blends are generated according to the following procedures:

Compression Molding: Samples are melted at 190° C. for 3 minutes and compression molded at 190° C. under 20,000 lb of oressure for another 2 minutes. Subsequently, the molten materials are quenched in a press equilibrated at room temperature.

Density: The density of the samples is measured according to ASTM-D792.

Differential Scanning Calorimetry (DSC): A Dupont DSC-2920 is used to measure the thermal transition temaccording to ASTM-D730. Tensile properties of the comoression molded samples are measured using an Instron 145 tensile machine ecuipped with an extensiometer. ASTM-D638 sanoles are tested at a strain rate of 5 min$^{-1}$. The average of four tensile measurements is given. The yield stress and yield strain are recorded at the inflection point in the stress/strain curve. The Energy at break is the area under the stress/strain curve.

Tensile Stress Relaxation: Uniaxial tensile stress relaxation is evaluated using an Instron 1145 tensile machine. Compression molded film (~20 mil thick) with a 1 in. (25.4 mm) gauge length is deformed to a strain level of 50% at a strain rate of 20 min$^{-1}$. The force required to maintain 50% eloncation is monitored for 10 min. The magnitude of the stress relaxation is defined as $(f_i-f_f/f_i)$ where $f_i$ is the initial force and $f_f$ is the final force.

Examples 1–3

Blend Preparation: Three blend compositions, examples 1, 2 and 3, are prepared from interpolymers (A) and (B) above in weight ratios of (A)/(B) of 75/25, 50/50 and 25/75 with a Hakke mixer eauipped with a Rheomix 3000 bowl. The blend components are first dry blended and then fed into the mixer equilibrated at 190° C. Feeding and temperature equilibration took about 3 to 5 minutes. The molten material is mixed at 190° C. and 40 rpm for 10 minutes.

The characterization data for the blends and the interpolymer components is presented in table 2. Interpolymer blend components (A) and (B) have molecular weights which are significantly different, and styrene content which differ by 28 mol. %.

lates to higher melt elasticity and improved part forming characteristics under certain melt processing operations.

Example 4

A blend composition, example 4, is prepared from interpolymers (A) and (C) in a 50/50 weight ratio of components, according to the same procedure employed in examples 1–3.

The characterization data for the blends and the interpolymer components is presented in table 3. Interpolymer blend components (A) and (C) have molecular weights (Mn) which both exceed 100,000 and styrene contents which differ by 28 mol. %.

TABLE 2

| | Example or Comparative Experiment No. | | | | |
|---|---|---|---|---|---|
| | (A)* | (B)* | 1 | 2 | 3 |
| Blend Composition, wt ratio | 100% (A) | 100% (B) | (A)/(B) 75/25 | (A)/(B) 50/50 | (A)/(B) 25/75 |
| av. blend styrene content$^d$ mole % | N/A$^a$ | N/A$^a$ | 32.7 | 27.5 | 22.3 |
| styrene mole % difference | N/A$^a$ | N/A$^a$ | 20.8 | 20.8 | 20.8 |
| % Mn difference | N/A$^a$ | N/A$^a$ | 141 | 141 | 141 |
| Mechanical Properties | | | | | |
| Shore A | 96 | 75 | 96 | 91 | 80 |
| Tensile Modulus, MPa | 594.3 | 6.5 | 1143.2 | 326.8 | 28.2 |
| Flexural Modulus, MPa | 617.1 | 68.8 | 531.1 | 169.9 | 24.4 |
| Yield Stress, MPa | 5.6 | 1.3 | 10.8 | 4.6 | 2.3 |
| % Strain @ Break | 257.8 | 475.3 | 287.7 | 370.2 | 415.6 |
| Stress @ Break, MPa | 21.5 | 22.6 | 23.7 | 25 | 25.5 |
| Energy @ Break, N.m | 118.5 | 102.2 | 146.3 | 152.4 | 126.8 |
| observed % Stress Relaxation | 92.9 | 38 | 86.9 | 82.2 | 67.2 |
| calculated % Stress Relaxation$^c$ | N/A | N/A | 79.2 | 65.0 | 51.7 |
| Melt Rheology | | | | | |
| η × 10$^5$ (0.1 rad/sec), Poise | 6.53 | 1.05 | 3.75 | 2.34 | 1.57 |
| η (100/0.1) | 0.048 | 0.15 | 0.058 | 0.078 | 0.16 |
| Tan δ (0.1 rad/sec) | 4.42 | 4.2 | 2.16 | 2.46 | 2.14 |

*Not an example of the present invention
$^a$Not applicable
$^b$calculated as:
((Wt% A/100) × A Styrene mol %) + ((Wt% B/100) × B Styrene mol %)
$^c$calculated as:
((Wt% A/100) × A % Relax) + ((Wt% B/100) × B % Relax)

Table 2 shows that the blend composition examples 1, 2 and 3 all have high tensile energies at break, which significantly exceed the performance of the unblended interpolymers, comparative examples (A) and (B). Further, the blends retain an unexpected level of stress relaxation compared to what may be anticipated from the component polymers.

Blend examples 1, 2 and 3 also have tan δ values at low shear rates in the melt which are significantly lower than either of the component polymers (A) and (B). This trans-

TABLE 3

| | Example or Comparative Experiment No. | | |
|---|---|---|---|
| | (A)* | (C)* | 4 |
| Blend Composition, wt ratio | 100% (A) | 100% (C) | (A)/(C) SC/SC |
| av. blend styrene content | N/A$^a$ | N/A$^a$ | |

TABLE 3-continued

|  | Example or Comparative Experiment No. | | |
|---|---|---|---|
|  | (A)* | (C)* | 4 |
| mole % |  |  |  |
| styrene mole % difference | N/A[a] | N/A[a] | 27.9 |
| % Nn difference | N/A[a] | N/A[a] | 36.4 |
| Mechanical Properties | | | |
| Shore A | 96 | 88 | 96 |
| Tensile Modulus, MPa | 594.3 | 20 | 424.7 |
| Flexural Modulus, MPa | 617.1 | 62.1 | 202 |
| Yield Stress, MPa | 5.6 | 2.4 | 5.9 |
| % Strain @ Break | 257.8 | 377.5 | 313 |
| Stress @ Break MPa | 21.5 | 34.3 | 37 |
| Energy @ Break, N.m | 118.5 | 145.5 | 188 |
| observed % Stress Relaxation | 92.9 | 30.2 | 75.1 |
| calculated % Stress Relaxation[c] | N/A[a] | N/A[a] | 61.5 |
| Melt Rheology | | | |
| η × 10⁵ (0.1 rad/sec), Poise | 6.53 | 16.8 | 10.3 |
| η (100/0.1) | 0.048 | 0.16 | 0.048 |
| Tan δ (0.1 rad/sec) | 4.42 | 2.37 | 2.14 |

*Not an example of the present invention
[a]Not applicable
[b]calculated as:
((Wt% A/100) × A Styrene mol %) + ((Wt% C/100) × C Styrene mol %)
[c]calculated as:
(Wt% A/100) × A % Relax) + ((Wt% C/100) × C % Relax)

Table 3 shows the blend composition example 4 has a high tensile energy at break, which significantly exceeds the performance of the unblended interpolymers, comparative examples (A) and (C) Further, the blend retains a level of stress relaxation biased towards the performance of component (A).

Blend example 4 also has a tan δ value at low shear rates in the melt which is lower than either of the component polymers (A) and (C). The shear thinning (η(100/0.1) of the blend, related to melt processing characteristics, is identical to that of component (A)

Examples 5–8

Interpolymer blend component (D) has a significantly lower number average molecular weight(Mn) and broader molecular weight distribution (higher Mw/Mn) comoared to the other four interpolymers, (A), (B), (C) and (E). Interpolymer blend component (D) has a different styrene content to interpolymers (A) and (C), and an essentially similar styrene content to interpolymer (E), differing by only 3 mol. %.

Blends are prepared from interpolymer (D) and interpolymers (A), (C) and (E) in a 10/90 weight ratio of components to give examples 5, 6 and 7 respectively, and from interpolymers (D) and (C) in a 30/70 weight ratio of components to give example 8, according to the same procedure employed in examples 1–3.

The characterization data for the blend examples and the interpolymer components is presented in table 4.

Table 4 shows that blend component interpolymer, and comparative example, (D) is a low viscosity polymer with low tensile energy to break.

TABLE 4

|  | Example or Comparative Experiment No. | | | | | | | |
|---|---|---|---|---|---|---|---|---|
|  | (A)* | (C)* | (D)* | (E)* | 5 | 6 | 7 | 8 |
| Blend Composition, wt ratio | 100% (A) | 100% (C) | 100% (D) | 100% (E) | (D)/(A) 10/90 | (D)/(E) 10/90 | (D)/(C) 10/90 | (D)/(C) 30/70 |
| av. blend styrene content[d] mole % | N/A[a] | N/A[a] | N/A[a] | N/A[a] | 35.7 | 19.2 | 2.5 | 11.9 |
| Styrene mole % difference | *N/A[c] | N/A[c] | N/A[c] | N/A[c] | 21.4 | 3 | 6.5 | 6.5 |
| Mn difference | N/A[c] | N/A[c] | N/A[c] | N/A[c] | 1,126 | 965 | 768 | 768 |
| Mechanical Properties | | | | | | | | |
| Shore A | 96 | 88 | 78 | 76 | 95 | 73 | 84 | 82 |
| Tensile Modulus, MPa | 594.3 | 20 | 19.3 | 6.8 | 550.9 | 8.3 | 24.8 | 20.7 |
| Flexural Modulus, MPa | 617.1 | 62.1 | 84.8 | 140.7 | 96.5 | 28.3 | 64.1 | 51 |
| Yield Stress, MPa | 5.6 | 2.4 | 2.3 | 1.5 | 4.8 | 1.3 | 2.4 | 2.2 |
| % Strain @ Break | 257.8 | 377.5 | 412.8 | 337.8 | 260.6 | 475.8 | 372.3 | 452.4 |
| Stress @ Break, MPa | 21.5 | 34.3 | 2.5 | 17.4 | 24.9 | 22.7 | 25 | 28.4 |
| Tensile Energy @ Break, N.m | 118.5 | 145.5 | 33.9 | 73.2 | 125.2 | 118 | 126 | 150.4 |
| observed % Stress Relaxation | 92.9 | 30.2 | 43.2 | 26.2 | 90.9 | 33.4 | 30.1 | 32.8 |
| calculated % Stress Relaxation[e] | N/A[a] | N/A[a] | N/A[a] | N/A[a] | 88.0 | 28.0 | 31.5 | 34.1 |
| Melt Rheology | | | | | | | | |
| η × 10⁵ (0.1 rad/sec) | 6.53 | 16.6 | [b] | 31 | 4.25 | 12 | 4.15 | 5.3 |

TABLE 4-continued

| | Example or Comparative Experiment No. | | | | | | | |
|---|---|---|---|---|---|---|---|---|
| | (A)* | (C)* | (D)* | (E)* | 5 | 6 | 7 | 8 |
| η (100/0.1) | 0.048 | 0.16 | b | 0.038[a] | 0.052 | 0.066 | 0.043 | 0.046 |
| Tan δ (0.1 rad/sec) | 4.42 | 2.37 | b | 1.26 | 4.44 | 2.33 | 2.61 | 3.74 |

*Not an example of the present invention
[a]η (100/3.98)
[b]Could not be measured
[c]Not applicable
[d]calculated as:
((Wt% D/100) × D Styrene mol %) + ((Wt % 2$^{nd}$ ESI/100) × 2$^{nd}$ ESI Styrene mol %)
[e]calculated as:
((Wt% D/100) × D % Relax) + ((Wt% 2$^{nd}$ ESI/100) × 2$^{nd}$ ESI % Relax)

Blend examples 5, 6, 7 anc 8 all show that even low additions of (D) brings about very large reductions in viscosity (η×10-5 (0.1 rad/sec) for interplyeers (A), (C) and (E). This is achieved whilst retaining or enhancing, the mechanical properties of interpolymers (R), (C) and (E), as is clearly shown by the tensile energy to break data, and stress relaxation behavior. Vlend examples 5, 6, 7 and 8 all show that the stress relaxation behavior of the blend is more than that expected by the additive values of the individual blend components as long as the overall styrene content of the sum of the weighted average styrene contents of the individual blend components i.e. the blends average styrene content is greater than about 15 mol %.

Preparation of Interpolymers F, G, H, I, & J Reactor Description

The single reactor use was a 6 gallon (23.7 L), oil jacketed, Autoclave continuously stirred tank reactor (CSTR). A magnetically coupled agitator with Lightning A-320 impellers provides the mixing. The reactor ran liquid full at 475 psig (3,275 kPa). Process flow was in the bottom and out the top. A heat transfer oil was circulated through the jacket of the reactor to remove some of the heat of reaction. After the exit from the reactor was a micromotion flow meter that measured flow and solution density. All lines on the exit of the reactor were traced with 50 psi (344.7 kPa) steam and insulated.

Procedure

Solvent, ethylbenzene unless stated, was supplied to the mini-plant at 30 psig (207 kPa). The feed to the reactor was measured by a Micro-Motion mass flow meter. A variable speed diaphragm pump controlled the feed rate. At the discharge of the solvent pump a side stream was taken to provide flush flows for the catalyst injection line (1 lb/hr (0.45 kg/hr)) and the reactor agitator (0.75 lb/hr (0.34 kg/hr)). These flows were measured by differential pressure flow meters and controlled by manual adjustment of micro-flow needle valves. Uninhibited styrene monomer was supplied to the mini-plant at 30 psig (207 kpa). The feed to the reactor was measured by a Micro-Motion mass flow meter. A variable speed diaphragm pump controlled the feed rate. The styrene stream was mixed with the remaining solvent stream. Ethylene was supplied to the mini-plant at 600 psig (4,137 kpa). The ethylene stream was measured by a Micro-Motion mass flow meter just prior to the Research valve controlling flow. A Brooks flow meter/controllers was used to deliver hydrogen into the ethylene stream at the outlet of the ethylene control valve. The ethylene/hydrogen mixture combines with the solvent/styrene stream at ambient temperature. The temperature of the solvent/monomer as it enters the reactor was dropped to ~5° C. by an exchanger with -5° C. glycol on the jacket. This stream entered the bottom of the reactor. The three component catalyst system and its solvent flush also enter the reactor at the bottom but through a different port than the monomer stream. Preparation of the catalyst components (catalyst; mixed alkyl aluminoxane (M-MAO); methyl dialkyl ammonium salt of tetrakis pentafluoroaryl borate) took place in an inert atmosphere glove box. The diluted components were put in nitrogen padded cylinders and charged to the catalyst run tanks in the process area. From these run tanks the catalyst was pressured up with pistom pumps and the flow was measured with Micro-Motion mass flow meters. These streams combine with each other and the catalyst flush solvent just prior to entry through a single injection line into the reactor.

Polymerization was stopped with the addition of catalyst kill (water mixed with solvent) into the reactor product line after the micromotion flow meter measuring the solution density. Other polymer additives can be added with the catalyst kill. A static mixer in the line provided dispersion of the catalyst kill and additives in the reactor effluent stream. This stream next entered post reactor heaters that provide additional energy for the solvent removal flash. This flash occurred as the effluent exited the post reactor heater and the pressure was dropped from 475 psig (3,275 kPa) down to 250mnm of pressure absolute at the reactor pressure control valye. This flashed polymer entered a hot oil jacketed devolatilizer. Approximately 85 percent of the volatiles were removed from the polymer in the devolatilizer. The volatlles exit the top of the devolatilizer. The stream was condensed and with a glycol jacketed exchanger, entered the suction of a vacuum pump and was discharged to a glycol jacket solvent and styrene/ethylene separation vessel. Solyent and styrene were removed from the bottom of the vessel and ethylene from the top. The ethylene stream was measured with a Micro-Motion mass flow meter and analyzed for composition. The measurement of vented ethylene plus a calculation of the dissolved gasses in the solvent/styrene stream were used to calculate the ethylene conversion. The polymer separated in the devolatilizer was pumped out with a gear pump to a ZSK-30 devolatilizing vacuum extruder. The dry polymer exits the extruder as a single strand. This strand was cooled as it was pulled through a water bath. The excess water was blown from the strand with air and the strand was chopoea into pellets with a strand chopper.

TABLE 5

| INTER-POLYMER | Reactor Temp. °C. | Solv. Flow lb/hr | Solv. Flow kg/hr | Ethylene Flow lb/hr | Ethylene Flow kg/hr | Hydrogen Flow SCCM | Styrene Flow lb/hr | Styrene Flow kg/hr | Vent Conv % |
|---|---|---|---|---|---|---|---|---|---|
| F[(1)] | 970226-1300 | 61.4 | 19.2 | 8.72 | 1.0 | 0.45 | 5.0 | 20.0 | 9.08 | 65.7 |
| G[(2)] | 960922-1400 | 80.2 | 16.6 | 6.44 | 1.7 | 0.77 | 12.0 | 12.0 | 5.45 | 86.2 |
| H[(2)] | 960924-0400 | 85.5 | 26.3 | 12.85 | 2.5 | 1.13 | 17.0 | 10.5 | 4.77 | 91.6 |
| I[(2)] | 961122-0600 | 83.7 | 28.5 | 12.94 | 2.1 | 0.95 | 7.0 | 9.8 | 4.45 | 87.8 |
| J[(2)] | 961119-1600 | 108.9 | 26.6 | 12.07 | 3.0 | 1.36 | 5.0 | 9.0 | 4.09 | 89.9 |

[(1)]Catalyst: $C_9H_3$-Ph-5, 6-$C_3H_6$-SiMe$_2$-N(tBu)-TiMe$_2$
[(2)]Catalyst: [($\eta$5-$C_5Me_4$)Me$_2$SiN(tBu)] Ti(CH$_2$=CH—CH=CHMe)
*This run was made with toluene solvent instead of ethylbenzene.

Examples 9–24

A summary of the blend components and blend compositions were given in Table 6.

TABLE 6

| Blend Components | wt % S (ES) | blend mol % S[a] | Tg1, C | Tg2, C | Tm, °C./% Xtyl | TMA, °0. | Shore A | Flex Mod, MPa | Elong, % | Ult Ten, MPa | Eb, Nm | Stress Relax, obs % | Stress Relax[b,] calc % |
|---|---|---|---|---|---|---|---|---|---|---|---|---|---|
| F* | 72.7 | N/A | 31.3 | | n/a | 63 | 97 | 125.8 | 298 | 15 | 78.7 | 92.4 | N/A |
| G* | 57.5 | N/A | 3.7 | | n/a | 57 | 64 | 5 | 1018 | 1.8 | 53.3 | 69 | N/A |
| H* | 52 | N/A | −3.9 | | n/a | 52 | 61 | 4 | 1218 | 2 | 34.7 | 80.1 | N/A |
| I* | 35.3 | N/A | −5.3 | | 63.8/13.3 | 78 | 86 | 29.7 | 566 | 23.3 | 139.9 | 32.5 | N/A |
| J* | 20.9 | N/A | broad | | 90.3/28.5 | 99 | 91 | 80.9 | 647 | 30.4 | 197.4 | 30.8 | N/A |
| Ex No.: Components | Ratio (wt %) | | | | | | | | | | | | |
| 9: F/G | 50/50 | 34.2 | 30.8 | 2.6 | n/a | 60 | 91 | 41.3 | 357 | 16.2 | 75.8 | 87.1 | 80.7 |
| 10: F/H | 50/50 | 32.2 | 28.8 | −7.5 | n/a | 58 | 91 | 34.9 | 360 | 14.1 | 71.3 | 88.9 | 86.2 |
| 11: F/G/H | 33/33/34 | 30.3 | 30 | 1.6 | n/a | 55 | 80 | 26.3 | 549 | 7.1 | 53.9 | 86.3 | 80.5 |
| 12: I/G | 25/75 | 23.2 | 2.8 | s | 65.8/10.0 | 58 | 69 | 14.1 | 768 | 5.5 | 47.1 | 68.1 | 59.8 |
| 13: I/G | 50/50 | 19.7 | 3 | s | 66.6/10.6 | 68 | 77 | 20.9 | 627 | 14.8 | 93.3 | 52.5 | 50.7 |
| 14: I/G | 75/25 | 16.2 | 1.9 | s | 65.7/16.3 | 76 | 80 | 20.3 | 622 | 23.9 | 147.4 | 43.3 | 41.6 |
| 15: I/F | 25/75 | 34.5 | 31.7 | −10.3 | 67.2/5.8 | 65 | 98 | 98.6 | 348 | 17.8 | 105.2 | 89.8 | 77.4 |
| 16: I/F | 50/50 | 27.3 | 31.3 | −8.8 | 65.9/6.2 | 73 | 97 | 58.6 | 436 | 21.7 | 13.3 | 77.4 | 62.4 |
| 17: I/F | 75/25 | 20.0 | 33.1 | −4.4 | 66.6/6.6 | 76 | 88 | 38 | 540 | 26.4 | 164.1 | 65.8 | 47.4 |
| 18: J/G | 25/75 | 21.7 | 4.5 | s | 90.9/27.0 | 58 | 73 | 16.3 | 822 | 4.7 | 57.5 | 71.4 | 59.4 |
| 19: J/G | 50/50 | 16.6 | 3.2 | s | 90.4/26.8 | 86 | 84 | 23.5 | 628 | 13.2 | 99.9 | 55.6 | 49.9 |
| 20: J/G | 75/25 | 11.6 | 1.2 | s | 90.2/27.2 | 97 | 89 | 56.6 | 628 | 22.6 | 174.3 | 36.9 | 40.3 |
| 21: J/F | 25/75 | 33.0 | 31.3 | s | 89.9/21.1 | 69 | 95 | 28.4 | 338 | 16.8 | 103.2 | 87.3 | 77.0 |
| 22: J/F | 50/50 | 24.2 | 29.7 | s | 90.7/22.0 | 86 | 93 | 42.5 | 408 | 19.1 | 128 | 77.2 | 61.6 |
| 23: J/F | 75/25 | 15.4 | 27.7 | s | 90.8/22.0 | 98 | 95 | 52.2 | 595 | 27.7 | 213.4 | 58.3 | 46.2 |
| 24: J/H/F | 33/33/34 | 23.7 | 28.8 | −5.9 | 89.4/22.1 | 71 | 90 | 20.8 | 412 | 12.3 | 82.4 | 80.9 | 67.8 |

*Not examples of the present invention.
Tg: measured from dynamic mechanical spectroscopy (DMS); maximum in tan δ loss peak for Tg.
Xtyl: % crystallinity; normalized with respect to blend composition.
s: shoulder or broad peak for Tg in DMS loss spectrum.
n/a: not applicable.
[a]calculated as:
((Wt % 1$^{st}$ ESI/100) × 1$^{st}$ ESI Styrene mol %) + ((Wt % 2$^{nd}$ ESI/100) × 2$^{nd}$ ESI Styrene mol %)
[b]calculated as: ((Wt % 1$^{st}$ ESI/100) × 1$^{st}$ ESI % Relax) + ((Wt % 2$^{nd}$ ESI/100) × 2$^{nd}$ ESI % Relax)

Interpolymer F is an ethylene/styrene interpolymer which contains 41.8 mole (72.7 wt.) percent copolymerized styrene in the interpolymer, 9.1 wt. percent of atactic polystyrene and has an $I_2$ melt index of 2.5, and a melt index ratio $I_{10}/I_2$ of 10.1

Interpolymer G is an ethylene/styrene interpolymer which contains 26.7 mole (57.5 wt.) percent copolymerized styrene in the interpolymer, 3.5 wt. percent of atactic polystyrene and has an $I_2$ melt index of 1.0, and a melt index ratio $I_{10}/I_2$ of 7.6

Interpolymer H is an ethylene/styrene interpolymer which contains 22.6 mole (52 wt.) percent copolymerized styrene in the interpolymer, 1.8 wt. percent of atactic polystyrene and has an $I_2$ melt index of 1.0, and a melt index ratio $I_{10}/I_2$ of 7.4

Interpolymer I is an ethylene/styrene interpolymer which contains 12.8 mole (35.3 wt.) percent copolymerized styrene in the interpolymer, 8.6 wt. percent of atactic polystyrene and has an $I_2$ melt index of 1.1, and a melt index ratio $I_{10}/I_2$ of 7.6

Interpolymer J is an ethylene/styrene interpolymer which contains 6.6 mole (20.9 wt.) percent copolymerized styrene in the interpolymer, 7.7 wt. percent of atactic polystyrene and has an $I_2$ melt index of 1.0, and a melt index ratio $I_{10}/I_2$ of 8.0

The blend examples of Table 6 further illustrate the utility and unique property balances which can be achieved by blending of Interpolymers.

Blends 9, 10 show two distinct glass transition processes from dynamic mechanical testing, combined with high tensile energy at break and a level of stress relaxation biased towards the performance of component (E).

Blend 11 shows two distinct glass transition processes from dynamic mechanical testing, reflecting the miscibility of components G and H giving a single Tg peak, with component F being present as a separate phase. This blend retains good mechanical properties and high stress relaxation.

Blends 12–17 show either broad temperature range for Tg, or two distinct Tg processes, combined with high tensile energies at break and unexpected levels of stress relaxation compared to what may be anticipated from the component polymers.

Blends 18–23 futher illustrate that good thermal performance, as evidenced by TMA probe penetraton, can be achieved whilst retaining good mechanical properties and high stress relaxation behavior.

Blends 9–24 all show improved stress relaxation over and above what would be expected a simple additive effect of the % stress relaxation's of the individual blend components.

What is claimed is:

1. Sheet or film resulting from calendering, blowing or casting an interpolymer blend comprising a plurality of substantially random interpolymers each interpolymer comprising:
   (1) from about 1 to about 65 mole percent of polymer units derived from either
      (a) at least one vinyl aromatic monomer or
      (b) at least one aliphatic or cycloaliphatic vinyl or vinylidene monomer selected from the group consisting of 5-ethylidene-2-norbornene, 1-vinylcyclohexene, 3-vinylcyclohexene, and 4-vinylcyclohexene, or
      (c) a combination of at least one of said vinyl aromatic monomer and at least one of said aliphatic or cycloaliphatic vinyl or vinylidene monomer, and
   (2) about 35 to about 99 mole percent of polymer units derived from ethylene and/or at least one aliphatic alpha olefin having from 3 to 20 carbon atoms; and wherein:
   (3) the amount of polymer units derived from said vinyl aromatic monomer and/or said aliphatic or cycloaliphatic vinyl or vinylidene monomer in any interpolymer component differs from that amount in another interpolymer component by at least 0.5 mole percent;
   (4) the amount of polymer units derived from said vinyl aromatic monomer and/or said aliphatic or cycloaliphatic vinyl or vinylidene monomer in the blend is greater than about 19 mole percent; and wherein
   (5) the observed stress relaxation of the resulting blend is greater than the additive stress relaxation of the of the individual blend components.

2. Fibers, foams or latices prepared from an interpolymer blend comprising a plurality of substantially random interpolymers each interpolymer comprising:
   (1) from about 1 to about 65 mole percent of polymer units derived from either
      (a) at least one vinyl aromatic monomer or
      (b) at least one aliphatic or cycloaliphatic vinyl or vinylidene monomer selected from the group consisting of 5-ethylidene-2-norbornene, 1-vinylcyclohexene, 3-vinylcyclohexene and 4-vinylcyclohexene, or
      (c) a combination of at least one of said vinyl aromatic monomer and at least one of said aliphatic or cycloaliphatic vinyl or vinylidene monomer, and
   (2) from about 35 to about 99 mole percent of polymer units derived from ethylene and/or at least one aliphatic alpha olefin having from 3 to 20 carbon atoms; and wherein;
   (3) the amount of polymer units derived from said vinyl aromatic monomer and/or said aliphatic or cycloaliphatic vinyl or vinylidene monomer in any interpolymer component differs from that amount in another interpolymer component by at least 0.5 mole percent;
   (4) the amount of polymer units derived from said vinyl aromatic monomer and/or said aliphatic or cycloaliphatic vinyl or vinylidene monomer in the blend is greater than about 19 mole percent; and wherein
   (5) the observed stress relaxation of the resulting blend is greater than the additive stress relaxation of the of the individual blend components.

* * * * *